(12) United States Patent
Shen et al.

(10) Patent No.: US 9,641,280 B1
(45) Date of Patent: May 2, 2017

(54) ANTI-JAMMING METHOD IN SATELLITE COMMUNICATION (SATCOM) SYSTEM

(71) Applicant: Intelligent Fusion Technology, Inc, Germantown, MD (US)

(72) Inventors: Dan Shen, Germantown, MD (US); Gang Wang, Germantown, MD (US); Genshe Chen, Germantown, MD (US); Khanh D. Pham, Kirtland AFB, NM (US); Erik Blasch, Rome, NY (US)

(73) Assignee: INTELLIGENT FUSION TECHNOLOGY, INC, Germantown, MD (US)

( * ) Notice: Subject to any disclaimer, the term of this patent is extended or adjusted under 35 U.S.C. 154(b) by 0 days.

(21) Appl. No.: 14/965,758

(22) Filed: Dec. 10, 2015

(51) Int. Cl.
*H04B 1/00* (2006.01)
*H04K 3/00* (2006.01)
*H04B 1/715* (2011.01)
*H04B 7/185* (2006.01)

(52) U.S. Cl.
CPC ............ *H04K 3/20* (2013.01); *H04B 1/715* (2013.01); *H04B 7/18515* (2013.01)

(58) Field of Classification Search
CPC .................................................. H04B 1/7156
USPC .......................................................... 375/133
See application file for complete search history.

(56) References Cited

U.S. PATENT DOCUMENTS

| | | | | |
|---|---|---|---|---|
| 5,100,084 A | * | 3/1992 | Rahn | B64G 1/24 244/165 |
| 6,118,805 A | * | 9/2000 | Bergstrom | H04B 1/713 370/208 |
| 6,463,290 B1 | * | 10/2002 | Stilp | G01S 5/02 455/456.1 |
| 2010/0283681 A1 | * | 11/2010 | Remondi | G01S 19/04 342/357.66 |
| 2010/0304686 A1 | * | 12/2010 | Kennedy | H04W 24/00 455/67.11 |

OTHER PUBLICATIONS

Dan Shen, et al, Network Survivability Oriented Markov Games (NSOMG) in Wideband Satellite Communications, IEEE, Oct. 5-9, p. 1-9.

* cited by examiner

*Primary Examiner* — Lihong Yu
(74) *Attorney, Agent, or Firm* — Anova Law Group, PLLC (57) ABSTRACT

Various embodiments provide an anti-jamming method in a satellite communication (SATCOM) system. A waveform modulation is performed on a waveform of a source data to provide a modulated waveform transmitted to a transmitter and then to a receiver. The modulated waveform transmitted from the receiver is demodulated to provide a demodulated waveform. In response to interference, a game reasoning process is performed on the demodulated waveform to provide an anti-jamming adaptive waveform. By performing a game-optimal waveform modulation on the anti-jamming adaptive waveform, a frequency hopping process is used to guide the data transmission, such that the source data is transmitted with a minimal probability of being interfered.

15 Claims, 3 Drawing Sheets

ANTI-JAMMING METHOD IN SATELLITE COMMUNICATION (SATCOM) SYSTEM

GOVERNMENT RIGHTS

The present disclosure was made with Government support under Contract No. FA9453-13-M-0154, awarded by the United States Air Force Research Laboratory. The U.S. Government has certain rights in the present disclosure.

FIELD OF THE DISCLOSURE

The present disclosure generally relates to the field of cognitive radio transmission and, more particularly, relates to an anti-jamming method and its cognitive radio testbed apparatus in satellite communication (SATCOM).

BACKGROUND

In the future satellite communications infrastructure, it is envisioned that satellite communication (SATCOM) systems and hybrid space-terrestrial systems will be the essential components for improved connection capabilities and enhanced defensive control over complex collaborative missions.

Wideband geosynchronous orbit (GEO) SATCOM can provide flexible, high-capacity communications for the support equipment through procurement and operation of the satellite constellation and the associated control systems. It provides worldwide flexible, high data rate and long haul communications for various ground elements, support agencies, and interested users. It can leverage cost-effective methods and technological advances in the communications satellite industry.

Each GEO satellite provides service in both the X and Ka frequency bands, with the unprecedented ability to cross-band between the two frequencies onboard the satellite. It features an electrically steerable and phased array X-band, a mechanically steered Ka-band, and a fixed earth-coverage X-band. These wideband space communication networks entail unprecedented complexity and unpredictability of the operating environments as well as extremely high stakes of interference or jamming.

Therefore, it is essential to develop cognitive spectrum management and agile waveform adaptation solutions that are not only context-aware and capable of learning and probing for subscriber distributions, quality of services, mission priorities and traffic patterns, but also agile in waveform adaptation to provide active countermeasures for persistent and adaptive RF interferences and adversarial jamming.

BRIEF SUMMARY OF THE DISCLOSURE

One aspect or embodiment of the present disclosure includes an anti-jamming method in a satellite communication (SATCOM) system. A waveform modulation is performed on a waveform of a source data to provide a modulated waveform. The modulated waveform is transmitted to a transmitter and then to a receiver and is demodulated to provide a demodulated waveform. In response to an interference, a game reasoning process is performed on the demodulated waveform to provide an anti-jamming adaptive waveform. A game-optimal waveform modulation is performed on the anti-jamming adaptive waveform to guide a frequency hopping process for data transmission, such that the source data is transmitted with a minimal probability of being interfered.

Optionally, information used in the game reasoning process is obtained: from a space object propagator, providing a location and a speed of a current satellite in the SATCOM system, from SATCOM performance evaluation, providing link budget information, and from spectrum sensing, providing a situational awareness of a current frequency and a current communication link of the current satellite in the SATCOM system.

Optionally, the waveform modulation is performed to transmit the waveform in one of a number of frequency bands, and the game reasoning process is preformed to guide the frequency hopping process by determining when to hop or which frequency band to hop to among the number of frequency bands during the waveform modulation.

Optionally, the interference is from a jammer interrupting the data transmission, and the jammer estimates states of the SATCOM system via space object automatic target recognition.

Optionally, the interference includes a radio frequency (RF) interference and an adversarial jamming.

Optionally, in the game reasoning process, player 1 and player 2 are included, player 1 is a jammer, and player 2 is the SATCOM system.

Optionally, the game reasoning process is implemented by, the transmitter, the receiver, and the jammer, each including a Universal Software Radio Peripheral (USRP) configured with Gnu's not Unix (GNU) Radio.

Optionally, each player in the game reasoning process is configured to discover exploits of the other player according to an impudent random process.

Optionally, the exploits of the second player of the SATCOM system at least include: a current band frequency being used, and a current communication link between a current satellite and a terminal for the data transmission, and the terminal is one of a LEO (low Earth orbit) satellite, an air vehicle, a surface vehicle, and ground station.

Optionally, the exploits of the second player of the SATCOM system are obtained by spectrum sensing and signal detection.

Optionally, the exploits of the first player of the jammer include the interference to a communication link in the SATCOM system.

Optionally, the frequency hopping process is determined by performing the game reasoning process under situations including: when each player knows the exploits of the other player, when only one player knows the exploits of the other player, and when none of the players knows the exploits of the other player.

Optionally, the source data includes a voice file, a video file, an image file, and a text message file.

Optionally, the waveform of the source data includes a wideband GEO SATCOM waveform transmitted in the SATCOM system via GEO satellites.

Optionally, the step of performing a waveform modulation includes a frequency hopping spread spectrum (FHSS) using multiple frequency shift keying (MFSK) modulation to transmit the wideband GEO SATCOM waveform.

Optionally, after the anti-jamming adaptive waveform is modulated by the game-optimal waveform modulation, the anti-jamming adaptive waveform is further transmitted to the transmitter and then to the receiver, demodulated, and transmitted to a data sink.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the disclosure may be practiced.

These embodiments are described in sufficient detail to enable those skilled in the art to practice the disclosure and it is to be understood that other embodiments may be utilized and that changes may be made without departing from the scope of the disclosure. The following description is, therefore, merely exemplary.

Various embodiments provide an anti-jamming method in a satellite communication (SATCOM) system.

For example, a waveform modulation may be performed on a waveform of a source data transmitted in the SATCOM system. The source data may include, for example, a voice file, a video file, an image file, and/or a text message file. In one embodiment, the waveform of the source data may include a wideband GEO SATCOM waveform transmitted using the GEO SATCOM system via GEO satellites.

In one embodiment, a frequency-hopping spread spectrum (FHSS) modulation may be performed on the waveform of the source data to provide a modulated waveform. In this case, multiple frequency-shift keying (MFSK) waveforms may be used to transmit a wideband GEO SATCOM waveform of the source data.

The modulated waveform may be transmitted from a transmitter, such as a radio frequency (RF) transmitter, to a receiver, such as a RF receiver. The modulated waveform may then be transmitted from the receiver to a spectrum demodulator to provide a demodulated waveform.

When an interferer (or a jammer) is present, interference from the interferer (or jammer) may interrupt the data transmission in the SATCOM system. The disclosed methods may thus be used to avoid jamming in the SATCOM system.

For example, in response to an interference, such as a RF interference and/or an adversarial jamming, in the SATCOM system, a game reasoning process may be performed on the demodulated waveform to provide an anti-jamming adaptive waveform. Accordingly, a game-optimal waveform modulation, such as a game-optimal FHSS modulation, may be performed on the anti-jamming adaptive waveform to guide a frequency hopping process in the SATCOM system for data transmission. In this case, the source data may be transmitted with a minimal probability of being interfered.

The game reasoning process may be performed based on information/status of the SATCOM system and the interferer (or the jammer). Such information/status may be obtained, for example, from a space object propagator to provide a location and a speed of a current satellite in the SATCOM system; from a SATCOM performance evaluation to provide link budget information; and from a spectrum sensing process to provide a situational awareness of a current frequency and a current communication link (e.g., of the current satellite) in the SATCOM system. In the game reasoning process, the interferer (or jammer) may estimate the states of the SATCOM system via space object automatic target recognition (ATR).

As used herein, the link budget is accounting of all of the gains and losses from the transmitter, through the medium (free space, cable, waveguide, fiber, etc.) to the receiver in a telecommunication system. The link budget accounts for the attenuation of the transmitted signal due to propagation, as well as the antenna gains, feedline and miscellaneous losses. Randomly varying channel gains such as fading are taken into account by adding some margin depending on the anticipated severity of its effects. The amount of margin required can be reduced by the use of mitigating techniques such as antenna diversity or frequency hopping.

The waveform modulation (or spectrum modulation) is often performed to transmit the waveform in one of a number of frequency bands. The game reasoning process is preformed to guide the frequency hopping process during the waveform modulation such as FHSS modulation, by determining whether the frequency hopping process is needed, or when to hop and which frequency band should be hopped to, among the number of frequency bands to avoid jamming in the SATCOM system.

The game reasoning process may be performed according to a game theory used to solve the problems on how to perform game-optimal waveform modulation, e.g., on how to perform an anti-jamming adaptive (e.g., hopping) modulation based on the anti-jamming adaptive waveform to provide a frequency hopping method. Game value is a performance index of such frequency hopping method.

In various embodiments, the game reasoning process may include player 1 and player 2. For example, player 1 may be a jammer, while player 2 may be the SATCOM system, or vice versa. Each player in the game reasoning process may be configured to discover exploits of the other player according to an impudent random process.

The exploits of player 1, the interferer or jammer, may include the interference to a communication link in the SATCOM system. The exploits of player 2, the SATCOM system, may at least include: a current band frequency being used, and a current communication link between a current satellite such as a GEO satellite and a current terminal for the data transmission. The terminal may be one of a LEO (low Earth orbit) satellite, an air vehicle, a surface vehicle, and ground station. The exploits of player 2 of the SATCOM system may be obtained by spectrum sensing and signal detection.

As disclosed, by performing the game reasoning process, the frequency hopping method for transmitting data in the SATCOM system may be provided under various situations including, for example, when each player knows the exploits of the other player, when only one player knows the exploits of the other player, and when none of the players knows the exploits of the other player.

In various embodiments, a game theory enabled high-level anti-interference strategies may be provided in the present disclosure. A game theory model of strategic conflicts (e.g., jamming and/or anti-jamming) in SATCOM is designed to guide the high-level anti-interference (or anti-jamming) strategies. Space communication conflicts, such as interference in congested space environment, may be investigated as a two-player, zero-sum game in discrete time, where each player discovers the opponent's exploits according to an impudent random process. For a wideband GEO SATCOM system, the game value includes the performance evaluation of the communication links. Because the game is zero sum, payoffs for both players can be described by a single value. The optimal exercise strategies are derived and the value of engaging in space communication conflict is quantified.

After the anti-jamming adaptive waveform is modulated by the game-optimal waveform (e.g., FHSS) modulation to provide a frequency hopping method, the source data can be transmitted according to the frequency hopping method to the transmitter and then to the receiver, and may be further demodulated by a waveform demodulation, such as a FHSS demodulation, and/or transmitted to a data sink.

The disclosed game reasoning process may be implemented by the transmitter, the receiver, and the jammer. Each of them may include, for example, a hardware including Universal Software Radio Peripheral (USRP), configured with Gnu's not Unix (GNU) Radio.

A specific embodiment may provide a hardware-in-loop cognitive radio testbed apparatus using the game theoretic high-level anti-interference (or anti-jamming) strategies for satellite communications (SATCOM). The hardware-in-loop cognitive radio testbed apparatus may include the transmitter, the receiver, and the jammer.

The present disclosure has applications in space communication systems with frequency hopping capabilities. The present disclosure also provide testbed apparatus for designing secure anti-jamming reliable tactical terminals. Other potential commercial applications include civilian satellite networks, such as Global Positioning System (GPS), Globalstar, and Iridium satellite constellation.

The game reasoning process based on game theoretic solution and the associated analysis provide high-level insights on SATCOM interference. Unlike the one-sided optimization setup, the game theoretic approach is a two-sided solution, which is derived from not only the space communication systems, but also the potential jammers. In one embodiment, the adaptation of the anti-jamming adaptive waveforms may be based on a Markov game reasoning engine.

Figure 1:
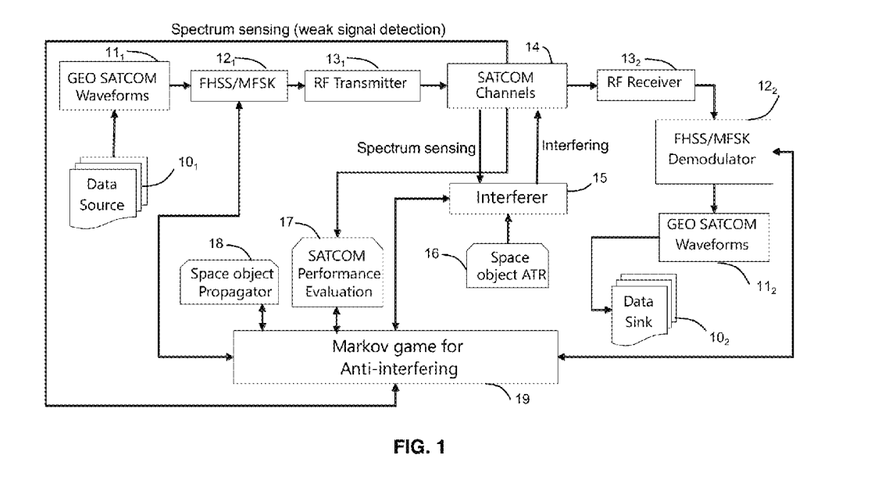
FIG. 1 depicts a block diagram illustrating an exemplary anti-jamming method in satellite communication (SATCOM) system according to various disclosed embodiments.
Figure 3:
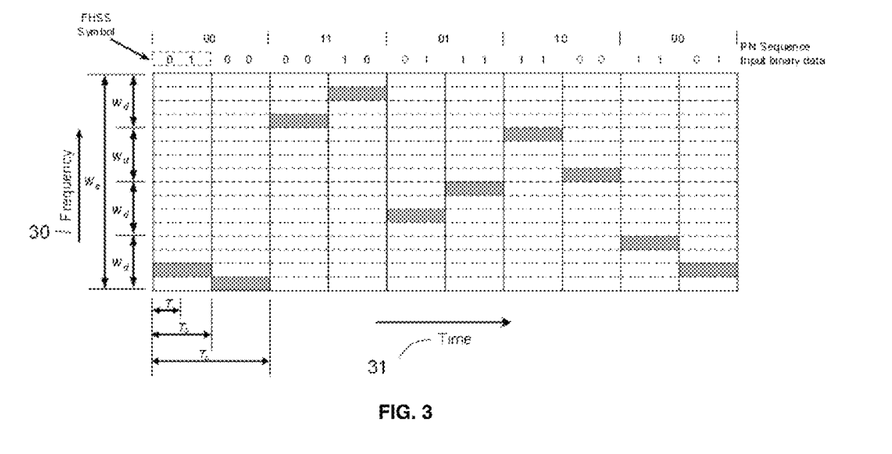
FIG. 3 depicts a frequency hopping spread spectrum (FHSS) using multiple frequency shift keying (MFSK) modulation according to various disclosed embodiments.

FIG. 1 depicts a block diagram illustrating an exemplary anti-jamming method in satellite communication (SATCOM) system according to various disclosed embodiments;

In this specific example shown in FIG. 1, the solution framework has two levels of anti-jamming means. The first level is to perform the exemplary frequency-hopping spread spectrum (FHSS) using multiple frequency-shift keying (MFSK) waveforms to transmit the Wideband GEO SATCOM waveform. A typical implementation of this tactic level anti-jamming is shown in FIG. 3.

As illustrated in FIG. 1, the source data $10_1$ first goes through GEO SATCOM waveforms $11_1$, then the FHSS/MFSK $12_1$. The modulation results are transmitted by the radio frequency (RF) transmitter $13_1$ via the SATCOM channels 14. At the other side, the RF receiver $13_2$ can get the RF signal and pass it to FHSS/MFSK demodulator $12_2$, then GEO SATCOM waveforms $11_2$. Then the receiver side can get the transmitted data in data sink $10_2$. This lower level anti-jamming means is quite resistant to interference and jamming. However, either the frequency usage is not efficient or the jammer/interferer can easily saturate the band and terminate the link.

Therefore, a second level, strategic frequency hopping process is added as the additional controls for the exemplary FHSS/MFSK modulation $12_1$. The main part of this level is the Markov game model for anti-jamming or anti-interfering 19. The game model may obtain input from space object propagator 18, from SATCOM performance evaluation 17, and from spectrum sensing. The advantage of game model is to make decisions with the consideration of the opponent, jammer (or interferer) 15, who receives input from space object automatic target recognition (ATR) 16.

Figure 2:
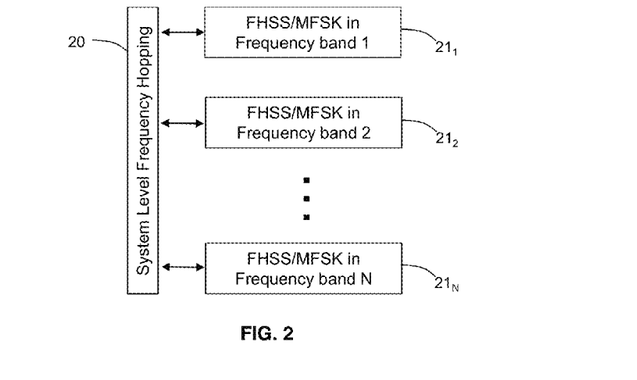
FIG. 2 depicts a block diagram illustrating an exemplary system level frequency hopping process according to various disclosed embodiments.

FIG. 2 depicts concept level framework of the Markov game based strategic level frequency hopping process for anti-jamming. In each frequency bin $21_1$ to $21_N$, traditional FHSS/MFSK can be performed to transmit the GEO SATCOM data. In the system level frequency hopping 20, the Markov game engine determines when and where (which bin from $21_1$ to $21_N$) the GEO SATCOM transmission occurs.

FIG. 3 is a typical FHSS/MFSK implementation. In this case, T is the bit duration, $T_s$ is the duration of a signal element, and $T_c$ is the frequency shift time. M=4 different frequencies are used to encode $\log_2 M=2$ data bits. Each channel has a total MFSK bandwidth of $W_d=M \times f_d$. FHSS uses $2^k$ (k=2) different channels, so the total FHSS bandwidth Ws=$2^k W_d$=$4W_d$. Take column 3 as an example, the PN code is 11 and MFSK symbol is 00. PN=11 means the $4^{th}$ (controlled by PN code, from bottom to top, the first is 00, then 01, 10, and 11, following a binary coding) $W_d$ will be used. Symbol 00 means the $1^{st}$ channel (controlled by symbol, from bottom to top, the first is 00, then 01, 10, and 11) is used to transmit the data. The frequency 30 is increased from bottom to top. The time 31 is increased from left to right.

Figure 4:
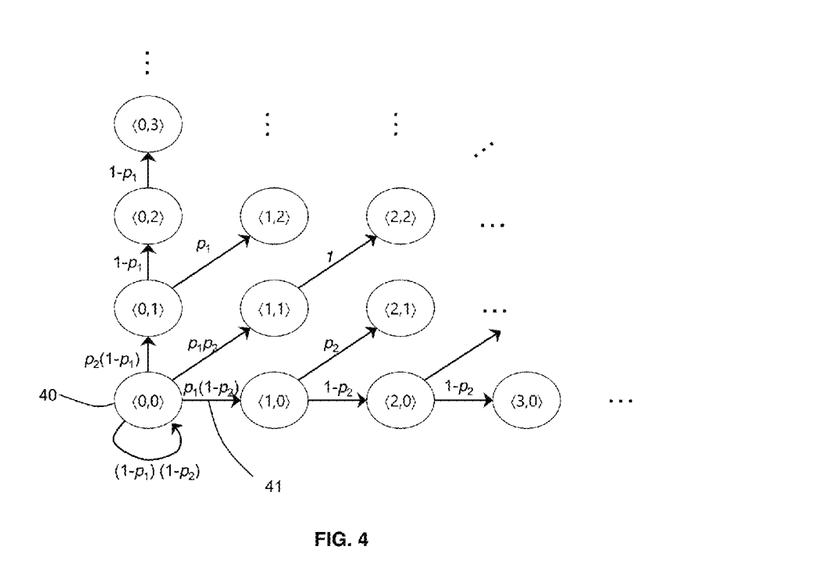
FIG. 4 depicts state transition of players in an exemplary game reasoning process according to various disclosed embodiments.

FIG. 4 is a state transition of the exemplary Markov game model. The discrete time zero-sum Markov game is exploited to investigate the SATCOM conflicts (jamming and anti-jamming). For the game model, there are two players. Player 1 is the adversarial jammer and player 2 is the SATCOM system (transceiver). Each game player discovers the opponent's exploits according to an impudent random process. Here player 2's exploit is the normal SATCOM link between GEO and terminals: such as LEO (low Earth orbit), air vehicles, surface vehicles, and ground station. Player 1's exploit is the interference.

If player 2 detects an exploit, the SATCOM system knows the current communication link is being interfered. On the other hand, when player 2 discovers an exploit, the interferer knows a SATCOM link exists in which band and between which objects. Such information can be obtained from the spectrum sensing and signal detection modules. Upon discovery, the player must decide if and when to exercise action based on the exploits. For example, player 1 may wait awhile to let the SATCOM link occur. In that way, the payoff for the interference side is greater than the payoff using immediately interference strategy. For player 2, upon detecting interference, the SATCOM system may keep the link awhile before hopping to another frequency. It is because of the relink cost and the possibility of the random interference. During the waiting period (interference presence), player 2 suffers lower throughput and longer transmission delays. The disclosure derives optimal exercise strategies and quantifies the value of engaging in space communication conflict.

The model focuses on a strategic space communication conflicts between two players. Let i index the players i∈{1, 2}, where player 1 is an interferer and player 2 is for space communication system. Let T be the system clock. The game starts at T=0. By creating a discrete-time model, where T increases over a set of positive integers. Let $d_i$ be the moment that player i discovers the opponent's exploit. By definition, aware time $\tau_i$=max (0, T−$d_i$) is the relative time that player i has known about the exploit. By definition, if player i is not aware of the exploit, $\tau_i$=0. Then a state of the game S is defined as:

$$S = <T, \tau_1, \tau_2> \quad (1)$$

where the elements of this three-tuple represents how long (T) the game has existed, how long ($\tau_1$) player 1 has known player 2's exploit, and how long ($\tau_2$) player 2 has known player 1's exploit, respectively.

A success of player 1 (e.g., interferer) depends on both his ability to detect the exploit and the timing of interference. The launch time includes the radio-frequency (RF) propagation time delay. Similarly, a successful player 2 (e.g., Wideband GEO SATCOM) can quickly detect the interference source and the good timing to execute the anti-interference methods using the applied adaptive waveform. Let $p_i(T)$ denote the probability that player i discovers the opponent's exploit as system clock progresses from period T to period T+1. Let $a_i(T, \tau_i)$ be the value of interference (for player 1) or value of anti-interference (for player 2) with a aware time of $\tau_i$ and the system clock T. Two constraints are imposed on $a_i(T, \tau_i)$.

First, assuming $a_i(T, 0)$=0, it means that if an exploit is not detected, interference or anti-interference has no value. Second, assuming 0≤$a_i(T, \tau_i)$≤$B_i$, where $B_i$ is an arbitrary upper bound, thus disallowing interference or anti-interference with either a negative value or an infinite value.

Once a player detects an exploit, the player may choose to use the exploit (interference for player 1 or anti-interference for player 2). Let $\theta_i(T)$ denote the action set of player i at time T. By definition, $\theta_i(T) \cup \{W, A\}$ where W. Wait. While a player is waiting, the player is either waiting to discover his opponent's exploit ($\tau_i$=0) or may already know the exploit ($\tau_i$>0) but waits for the interference to be more effective (for player 1) or less anti-interference effects (for player 2). A means Action (an interference for player 1 or an anti-interference for player 2). When a player takes actions, the player receives the value at that time.

For example, a player who does not know the exploit has a singleton action set {W}, and a player that does know the exploit has the full action set, {W, A}.

The Markov game begins in the state <T, $\tau_1$, $\tau_2$>=<0, 0, 0> and proceeds in discrete rounds. In each round, the clock time T increases deterministically. For each player i, the aware time $\tau_i$=0 until the player discovers the exploit. Exploit discovery happens with probability $p_i(T)$ for player i in round T. When an "exploit" is discovered by a player, the player's aware time increases deterministically. The resulting transitions of the Markov game state are summarized in Table 1. A visual depiction of state of the game is presented in FIG. 4.

TABLE 1

Markov game state transitions as a function of (T, $\tau_1$, $\tau_2$) and actions

| | $\tau_2 = 0$ | $\tau_2 > 0$ |
|---|---|---|
| $\tau_1 = 0$ | $\theta_1(T) = \{W\}, \theta_2(T) = \{W\}$ | $\theta_1(T) = \{W\}, \theta_2(T) = \{A, W\}$ |
| | $\langle T, 0, 0 \rangle$ | $\langle T, 0, \tau_2 \rangle$ |
| | $\begin{cases} \xrightarrow{(1-p_1(T))(1-p_2(T))} \langle T+1, 0, 0\rangle \\ \xrightarrow{p_1(T)(1-p_2(T))} \langle T+1, 1, 0\rangle \\ \xrightarrow{(1-p_1(T))p_2(T)} \langle T+1, 0, 1\rangle \\ \xrightarrow{p_1(T)p_2(T)} \langle T+1, 1, 1\rangle \end{cases}$ | $\begin{cases} \xrightarrow{1-p_1(T)} \langle T+1, 0, \tau_2+1\rangle \\ \xrightarrow{p_1(T)} \langle T+1, 1, \tau_2+1\rangle \end{cases}$ |
| $\tau_1 > 0$ | $\theta_1(T) = \{A, W\}, \theta_2(T) = \{W\}$ | $\theta_1(T) = \{A, W\}, \theta_2(T) = \{A, W\}$ |
| | $\langle T, \tau_1, 0 \rangle$ | $\langle T, \tau_1, \tau_2 \rangle \xrightarrow{1}$ |
| | $\begin{cases} \xrightarrow{1-p_2(T)} \langle T+1, \tau_2+1, 0\rangle \\ \xrightarrow{p_2(T)} \langle T+1, \tau_2+1, 1\rangle \end{cases}$ | $\langle T+1, \tau_1+1, \tau_2+1\rangle$ |

In FIG. 4, the arrows in the diagram show the possible transitions from one state to another, as described in Table 1. The vertical line indicates that player 1 (interferer) detects spectrum used in space communication, while the horizontal line denotes the states where the player 2 (SATCOM system) has detected the interferer. The slant lines denote both players know the exploits. Let V(<T, $\tau_1$, $\tau_2$>) be the value of the game in state <T, $\tau_1$, $\tau_2$>. This value represents the expected value of the players if they play the game starting at that state.

In case 1 when both players know the exploits, $\tau_1$>0 and $\tau_2$>0. Table 2 represents the payoffs of the Markov game in such a state in matrix form.

TABLE 2

Payoff matrix for the Markov game when both players know the exploit.

| | Player 2 plays: W | Player 2 plays: A |
|---|---|---|
| Player 1 plays: W | V(<T + 1, $\tau_1$ + 1, $\tau_2$ + 1>) | −$a_2(T, \tau_2)$ |
| Player 1 plays: A | $a_1(T, \tau_1)$ | $a_1(T, \tau_1)$ − $a_2(T, \tau_2)$ |

Each entry in the matrix contains a single real number because since the game is zero sum one, where the player 1 wants to maximize the value and the other player 2 wants to minimize it. If both players wait, the value is determined by future play. If one player takes an action and the other waits, the acting player receives the value of action. If both players take action, the sum of the values give the result of the game. This leads to the following observation.

Theorem 1: For any game state <T, $\tau_1$, $\tau_2$) such that $\tau_1$>0 and $\tau_2$>0, "Action, Action" is an iterated elimination of dominated strategies equilibrium with a value of $a_1(T, \tau_1)$−$a_2(T, \tau_2)$. From the theorem 1, if the game starts in state <T, $\tau_1$, $\tau_2$> with $\tau_1$>0 and $\tau_2$>0, the game terminates immediately and the game value V(<T, $\tau_1$, $\tau_2$>)=$a_1(T, \tau_1)$−$a_2(T, \tau_2)$. Therefore, a game starting in <T, 0, 0> ends, optimally, no later than the following state is reached: <T, $\tau_1$, 1>, or <T, 1, $\tau_2$>.

In case 2 when only one players knows the exploit, the game reasoning process are performed from a state where player 1 has the exploit and player 2 does not. The analysis follows identical lines in the opposing situation. In this case, player 1 has a full action set and player 2 may only wait to discover the exploit, therefore $\theta_1=\{A, W\}$, $\theta_2=\{W\}$. Suppose the state of the game is $<T, \tau_1, 1>$. It is defined that:

$$Y=(1-p_2(T))V(<T+1,\tau_1+1,0>)+p_2(T)V(<T+1,\tau_1+1,1>) \quad (2)$$

is the expected utility if both players choose to wait at time T. Table 3 displays the payoffs in a matrix form.

TABLE 3

Payoff matrix for the Markov game when only player 1 knows the exploit.

|  | Player 2 plays: W |
| --- | --- |
| Player 1 plays: W | Y |
| Player 1 plays: A | $a_1(\tau_1)$ |

It is obvious that the player 1 (whose objective is to maximize the game value) prefers to Action if $Y \leq a_1(\tau_1)$. The fundamental analytic question is from which state does Player 1 prefer to act?" If Player 2 discovers the exploit, the game transitions to the case when Both players know the exploits. States $<T, \tau, 0>$ from which Player 1 prefers to act may be characterized as follows. $v_\tau(h)$ is defined as the expected utility to player 1 if player 1 waits h time steps before action, staring in state $<T, \tau, 0>$. In particular, for convenience, let $q_i(T)=1-p_i(T)$:

$$v_\tau(0) = a_1(\tau)$$

$$v_\tau(1) = q_2(T)a_1(\tau+1) + p_2(T)(a_1(\tau_1+1) - a_2(1))$$

$$v_\tau(2) = q_2(T+1)q_2(T)a_1(\tau+2) +$$
$$p_2(T+1)q_2(T)(a_1(\tau+2) - a_2(1)) + p_2(T)(a_1(\tau+1) - a_2(1))$$

$$v_\tau(h) = a_1(\tau+h)\prod_{k=0}^{h-1} q_2(T+k) +$$
$$\sum_{k=0}^{h-1}\left[(a_1(\tau+k+1) - a_2(1))p_2(T+k)\prod_{j=0}^{k-1} q_2(T+j)\right]$$

The definition of $v_\tau(h)$ allows evaluation of the states from which player 1 prefers to act. Player 1 prefers to act rather wait in state $<T, \tau, 0>$ if and only if $$a_1(\tau)=v_\tau(0) \geq v_\tau(h) \text{ for all } h \geq 1 \quad (3)$$

The Eq. (3) statement mirrors the intuition that a player should act only if an immediate action results in a higher utility than waiting for any number of turns before taking an action. Theorem 2: If $a_1(\tau)$ is concave and non-decreasing, and $p_2(T)$ is non-decreasing, then $v_\tau(0) \geq v_\tau(1)$, implying that the player should act in state $<T, \tau, 0>$ (i.e., player 1 can never do better by waiting). If assuming stationary probabilities $p_i(T)=p_i$, then Theorem 2 shows that $v_\tau(0) \geq v_\tau(1)$ is sufficient condition to prefer action at a holding time of $\tau$. This means that $v_\tau(0) \geq v_\tau(1)$ is necessary to prefer action at a holding time of T. Therefore, from state $<T, \tau, 0>$, player 1 waits for $$k^*=\min_k\{v_k(0) \geq v_k(1)\}=\min_k\{a_1(k+1)-a_1(k) \leq p_2 a_2(1)\} \quad (4)$$

time steps before action. Therefore, the game value is $$V(<T,1,0>)=v_0(k^*) \quad (5)$$

In the case 3 when neither player knows the exploit, then $\tau_1=\tau_2=0$. Therefore, both players have singleton action sets, $\theta_1=\{W\}$, $\theta_2=\{W\}$. The game value, given that player 1 discovers the exploit first, is $V(<T, \tau, 0>)$. Similarly, if player 2 detects the exploit first, the game value is $V(<T, \tau, 1>)$. If both players simultaneously discover the exploits, then the game value is $V(<T, \tau, 1>)=a_1(1)-a_2(1)$. Because the state $<T, 0, 0>$ transitions into previously analyzed states, only the first transition is concerned. For the stationary discovery probabilities, the next state transition probabilities out of $S=<T, 0, 0>$ are:

$$Pr\{\text{next state is } \langle T, 1, 0\rangle\} = \gamma_{1,0} = \frac{p_1(1-p_2)}{p_1(1-p_2)+p_2(1-p_1)+p_1 p_2}$$

$$Pr\{\text{next state is } \langle T, 0, 1\rangle\} = \gamma_{1,0} = \frac{p_2(1-p_1)}{p_1(1-p_2)+p_2(1-p_1)+p_1 p_2}$$

$$Pr\{\text{next state is } \langle T, 1, 1\rangle\} = \gamma_{1,1} = \frac{p_1 p_2}{p_1(1-p_2)+p_2(1-p_1)+p_1 p_2}$$

where the γ value for brevity has been introduced. The game value $$V(<T,0,0>)=\gamma_{1,0}V(<T,1,0>)-\gamma_{0,1}V(<T,0,1>)+\gamma_{1,1}V(<T,1,1>)=\gamma_{1,0}v^1(k_1^*)-\gamma_{1,0}v^2(k_2^*)+\gamma_{1,1}(a_1(1)-a_2(1)) \quad (6)$$

where the negative sign comes from the fact that player 1 is a maximizing player and player 2 is a minimizing player. $v^1(k_1^*)$ denotes the result of eq. (4)-(5), if player 1 is the first to discover the exploit, while $v^2(k_2^*)$ denotes the result of eq. (4)-(5), if player 2 is the first to discover the exploit.

Figure 5:
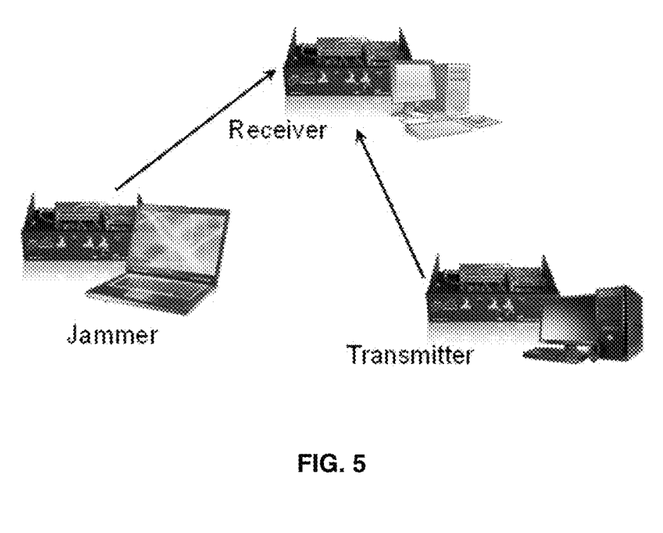
FIG. 5 depicts an exemplary cognitive radio testbed apparatus for implementing an exemplary anti-jamming method in a SATCOM system according to various disclosed embodiments.

FIG. 5 depicts an exemplary cognitive radio testbed apparatus for implementing an exemplary anti-jamming method in a SATCOM system according to various disclosed embodiments. The exemplary cognitive radio testbed apparatus may be a hardware setup including digital video broadcasting (DVB) transmitters and receivers, where digital modulation Gaussian Minimum Shift Keying (GMSK) modulation is used.

For example, the interferer may try to interrupt the data transmission from the transmitter to the receiver. It is assumed that the wideband GEO SATCOM transponder is perfect, i.e., no signal distortion caused by satellite transponder. A Universal Software Radio Peripheral (USRP) and Gnu's not Unix (GNU) Radio based hardware testbed apparatus has been implemented to demonstrate the integrated game theory enabled spectrum management and waveform adaptation. It is emulated that the interference and anti-interference conflicts in the frequency band of 1.3 GHz to 1.6 GHz.

In one example, a set of digital video broadcasting (DVB) transmitters and receivers may be built up, where digital modulation Gaussian Minimum Shift Keying (GMSK) is used. The input may be an mp4 video file. In the GMSK modulation, the samples/symbol is 2 and the bits/symbol is 1. Thus for each byte (8 bits) of data, 16 samples exist. Therefore the sample rate of USRP sink is 16 times that of the sample rate of Throttle, which specifies how fast to read the input file.

When transmitting video stream or video data, interference and anti-interference experiments may be performed using the hardware-in-loop implementation setup as shown in FIG. 5. As a result, the frequency hopping process guided by the disclosed game strategies can maintain video streaming in the congested environment with inadvertent interferers.

As such, in addition to the game theoretic model for anti-jamming waveform adaptation, the present disclosure also provides a hardware-in-loop cognitive radio testbed apparatus used for implementing the disclosed anti-jamming method in a satellite communication (SATCOM) system. An exemplary testbed apparatus includes the RF transmitter, the RF receiver, and the jammer, each with Universal Software Radio Peripheral (USRP) and Gnu's not Unix (GNU) Radio to demonstrate the game theoretic anti-jamming capabilities via spectrum management and waveform adaptation. In embodiments, the hardware testbed apparatus may include a set of digital video broadcasting (DVB) transmitters and receivers. In one embodiment, the frequency hopping guided by game strategies can maintain video streaming in the congested environment with inadvertent interferers.

While the disclosure has been illustrated with respect to one or more implementations, alterations and/or modifications can be made to the illustrated examples without departing from the spirit and scope of the appended claims. In addition, while a particular feature of the disclosure may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. An anti-jamming method in a satellite communication (SATCOM) system, comprising:
    performing a waveform modulation on a waveform of a source data to provide a modulated waveform;
    transmitting the modulated waveform to a transmitter and then to a receiver;
    demodulating the modulated waveform transmitted from the receiver to provide a demodulated waveform;
    in response to an interference of a jammer, performing a game reasoning process on the demodulated waveform to provide an anti-jamming adaptive waveform, wherein:
    a game player 1 and a game player 2 are included in the game reasoning process, the game player 1 is the jammer, and the game player 2 is the SATCOM system, according to an impudent random process each player in the game reasoning process discovers exploits of the other player;
    once the jammer detects an exploit of the SATCOM system, the jammer chooses to respond according to a game-optimal solution by which the SATCOM system's possible actions and associated consequences are compared and sorted; and
    the exploit of the SATCOM system at least includes: a currently-used band frequency and a current communication link between a current satellite and a terminal for the data transmission; and
    performing the waveform modulation after the game reasoning process on the anti-jamming adaptive waveform to guide a frequency hopping process for data transmission, such that the source data is transmitted with a minimal probability of being interfered.

2. The method according to claim 1, wherein information used in the game reasoning process is obtained:
    from a space object propagator, providing a location and a speed of a current satellite in the SATCOM system,
    from a SATCOM performance evaluation, providing link budget information, wherein the link budget information includes attenuation of transmitted signal due to propagation, antenna gains, and path losses in the SATCOM system, and
    from spectrum sensing, providing a situational awareness of a current frequency and a current communication link of the current satellite in the SATCOM system.

3. The method according to claim 1, wherein:
    the waveform modulation is performed to transmit the waveform in one of a number of frequency bands, and
    the game reasoning process is preformed to guide the frequency hopping process by determining when to hop or which frequency band to hop to among the number of frequency bands during the waveform modulation.

4. The method according to claim 1, wherein:
    the interference is from a jammer interrupting the data transmission, and
    the jammer estimates states of the SATCOM system via space object automatic target recognition.

5. The method according to claim 1, wherein:
    the interference includes a radio frequency (RF) interference and an adversarial jamming.

6. The method according to claim 1, wherein the game reasoning process is implemented by,
    the transmitter, the receiver, and the jammer, each including a Universal Software Radio Peripheral (USRP) configured with Gnu's not Unix (GNU) Radio.

7. The method according to claim 1, wherein:
    once the SATCOM system detects an exploit, the SATCOM system chooses to respond according to a game-optimal solution where the jammer's possible actions and associated consequences are compared and sorted, wherein the game-optimal waveform modulation corresponds to the game-optimal solution.

8. The method according to claim 7, wherein the exploits of the first player of the jammer include the interference to a communication link in the SATCOM system.

9. The method according to claim 1, wherein:
the terminal is one of a LEO (Low Earth Orbit) satellite, an air vehicle, a surface vehicle, and ground station.

10. The method according to claim 1, wherein the exploits of the second player of the SATCOM system are obtained by spectrum sensing and signal detection.

11. The method according to claim 1, wherein:
the frequency hopping process is determined by performing the game reasoning process under situations including: when each player knows the exploits of the other player, when only one player knows the exploits of the other player, or when none of the players knows the exploits of the other player.

12. The method according to claim 1, wherein the source data includes a voice file, a video file, an image file, and a text message file.

13. The method according to claim 1, wherein the waveform of the source data includes a wideband geosynchronous equatorial orbit (GEO) SATCOM waveform transmitted in the SATCOM system via GEO satellites.

14. The method according to claim 13, wherein the step of performing a waveform modulation includes a frequency hopping spread spectrum (FHSS) using multiple frequency shift keying (MFSK) modulation to transmit the wideband GEO SATCOM waveform.

15. The method according to claim 1, wherein after the anti-jamming adaptive waveform is modulated by the game-optimal waveform modulation, the anti-jamming adaptive waveform is further transmitted to the transmitter and then to the receiver, demodulated, and transmitted to a data sink.

\* \* \* \* \*